United States Patent [19]

Wade

[11] Patent Number: 5,606,672
[45] Date of Patent: Feb. 25, 1997

[54] METHOD AND APPARATUS FOR MULTIPLEXING SIGNALS FROM A BUS BRIDGE TO AN ISA BUS INTERFACE AND AN ATA BUS INTERFACE

[75] Inventor: Nicholas D. Wade, Cameron Park, Calif.

[73] Assignee: Intel Corporation, Santa Clara, Calif.

[21] Appl. No.: 380,020

[22] Filed: Jan. 27, 1995

[51] Int. Cl.$^6$ .................................................. G06F 13/00
[52] U.S. Cl. ........................... 395/308; 395/306; 395/309
[58] Field of Search ....................................... 395/306, 308, 395/309

[56] References Cited

U.S. PATENT DOCUMENTS

| | | | |
|---|---|---|---|
| 5,043,938 | 8/1991 | Ebersole | 395/200.2 |
| 5,125,080 | 6/1992 | Pleva et al. | 395/309 |
| 5,309,568 | 5/1994 | Ghosh et al. | 395/309 |
| 5,404,462 | 4/1995 | Datwyler et al. | 395/308 |
| 5,499,346 | 3/1996 | Amini et al. | 395/308 |

*Primary Examiner*—Jack B. Harvey
*Assistant Examiner*—Sumati Lefkowitz
*Attorney, Agent, or Firm*—Blakely, Sokoloff, Taylor & Zafman

[57] ABSTRACT

An apparatus and method for connecting a bus bridge to a plurality of bus interfaces. The invention allows output lines on a bus bridge to be shared so that a minimal amount of dedicated pins are utilized. Signals on the bus bridge which need to be driven and received quickly are connected directly from the bus bridge to the bus interfaces. Signals on the bus bridge which do not need to be driven and received quickly are connected from the bus bridge to the bus interfaces though buffers. The invention allows the bus bridge to interface a high speed local bus and a plurality of I/O buses while satisfying the timing requirements of each of the I/O buses.

6 Claims, 8 Drawing Sheets

Fig. 3

|  | TIMING REQUIREMENT TIGHT | TIMING REQUIREMENT NOT TIGHT |
|---|---|---|
| ATA BUS | DISK DATA SIGNALS | DISK ADDRESS SIGNALS CHIP SELECT SIGNALS |
| ISA BUS | LATCHED ADDRESS SIGNALS | SYSTEM ADDRESS SIGNALS SYSTEM BYTE HIGH ENABLE SIGNALS |

METHOD AND APPARATUS FOR MULTIPLEXING SIGNALS FROM A BUS BRIDGE TO AN ISA BUS INTERFACE AND AN ATA BUS INTERFACE

FIELD OF THE INVENTION

The present invention relates to the field of bus bridges used for interfacing a high bandwidth bus with a plurality of bus interfaces. More specifically, this invention relates to circuitry for connecting a bus bridge to a plurality of bus interfaces.

BACKGROUND OF THE INVENTION

Buses are generally classified as central processing unit (CPU) local buses or input/output (I/O) buses. Local buses are typically short in length, capable of transferring data at high speeds, and are matched to the memory system to maximize memory-CPU bandwidth. Usually, the designer of a Local bus is familiar with the types of devices that are to be connected to the bus and is able to design an efficient bus that is able to meet the needs of the devices. I/O buses, on the other hand, are often lengthy and may have many different types of devices connected to them. I/O buses also generally have a wide range in the data bandwidth of the devices connected to them.

I/O bus designs follow a bus standard because the number and variety of I/O devices are normally not fixed on a computer system. This permits users to add additional I/O devices to their system to meet their computing needs. As the interface to which these devices are connected, the I/O bus can be considered an expansion bus for adding I/O devices over time. Standards that let the computer designer and I/O device designer work independently, therefore, play a large role in determining the choice of bus that is implemented. As long as both the computer-system designer and the I/O device designer meet the requirements, any I/O device can connect to any computer.

Machines sometimes grow to be so popular that their I/O buses become de facto standards. An example of this is the well-known Industry Standard Architecture (ISA) bus structure. The ISA bus structure is implemented by many I/O device designers and is a desirable design choice for system designers because it supports a large share of peripheral devices. Unfortunately, since the ISA bus data throughput is limited to 8 MB/sec, a problem occurs when a user wants to connect a newer I/O device that runs at a throughput higher than 8 MB/sec to the ISA bus. An example of this problem is in the implementation of new Integrated Drive Electronics (IDE) drives in personal computers using the ISA bus structure.

In the past, when IDE drives operated with data throughputs of less than 8 MB/sec, a IDE drive attachment, know as an AT Attachment (ATA) bus, interfaced directly with the ISA bus. This connected the disk drive to the CPU through a local bus and a ISA I/O bus. Interfacing the ATA bus with the ISA bus was achieved by buffering the ISA data bus and the lower three bits of the address bus. Chip select signals were provided to the ATA bus by decoding the upper bits of the ISA address bus. This method of interface was inexpensive but limited in speed due to the inherent slow nature of the ISA bus and the buffers used to isolate the signals from the ISA bus. Because current ATA interfaces operate at data throughput rates in excess of 16.7 MB/sec, ATA buses are no longer connected to the system though the ISA bus. The data transfer requirements of the new drives are simply too high.

Today, IDE drive interfaces are designed for the high speed local bus, such as the VESA Local (VL) bus or Peripheral Component Interconnect (PCI). The fast data transfer requirements of the new drives can be met by connecting the ATA bus to the high speed local bus through an ATA to local bus bridge. Due to loading and protocol requirements of the ISA bus and the ATA bus, the ATA bus cannot be coupled to the high speed local bus by connecting it in series with the ISA bus. There are tight timing requirements on some ATA signals that require them to be directly driven by the local bus to ATA bridge. Similarly, there are tight timing requirement on some ISA signals that require them to be directly driven by the local bus to ISA bridge. Thus, in order to satisfy the loading and protocol requirements of the ISA bus and the ATA bus, designers have interfaced the ISA bus and the ATA bus directly in parallel with the high speed local bus by providing a dedicated pin on each bridge component for each signal to be transmitted to the ISA and ATA interfaces. When both the ISA bus and the ATA bus are connected directly in parallel to the high speed local bus, an additional bus bridge is utilized by designers for interfacing the ATA bus with the high speed local bus.

Using an additional bus bridge for directly interfacing the ATA bus to the Local bus requires an additional component package, additional pins for the package, and additional pin holes on the system circuit board. This translates to an additional cost to the system and the elimination of valuable real estate on the system circuit board. Since the prior art approach requires that every signal on the ISA and ATA interface be connected to a dedicated pin on the bridge component, the solution of packaging the two bridges into one physical component still requires an increase in the amount of pin and holes and thus does not completely solve the cost problem. Thus, there was little motivation in designing a combined ISA/ATA bridge component. Hence, circuitry which would allow a bridge component for the ISA and ATA interfaces to use a minimal amount of pins and packaging is desirable. As will be seen, the present invention overcomes the drawbacks of the prior art by providing circuitry which allows the output lines of a combined ISA/ATA bridge to be shared so that the number of pins on this single bridge component can be minimized. The present invention allows the pin requirement for a new combined ISA/ATA bridge, capable of highest speed ATA transfers, to be the same as previous ISA bridges.

SUMMARY OF THE INVENTION

The present invention relates to an apparatus and method for transmitting signals from a bus bridge to a plurality of bus interfaces.

The invention recognizes that the loading protocols of some bus interfaces impose tighter timing requirements on some signals than on others. This requires that those signals with tighter timing requirements be directly driven to their intended destination. The invention also recognizes that the cost of providing a single low pin count bridge package is more desirable than the cost of providing a high pin count bridge package or a plurality of low pin count bridge packages. Thus, rather than connect every signal on a bus interface to a dedicated pin on a bridge, the present invention divides the signals on each interface into fast and slow signals and buffers the slow signals from the fast signals. By buffering the slow signals from the fast signals, dedicated pins on a bridge component can be eliminated, thus improving the capacity of the bridge chip. This enables the implementation of a lower pin count package and eliminates the additional cost of the prior art.

In an embodiment of the invention, direct connections are made from a bus bridge component to a plurality of interfaces for transmitting signals which need to be driven quickly because of tight timing requirements. Buffered connections are made from the direct connections to the bus interfaces for transmitting signals which do not have tight timing requirements.

BRIEF DESCRIPTION OF THE DRAWINGS

The present invention will be understood more fully from the detailed description given below and the accompanied drawings of the preferred embodiment of the invention. The description and drawings are not meant to limit the invention to the specific embodiment. They are provided for explanation and understanding of the present invention.

FIG. 3 illustrates the timing requirements of the signals on the ISA and ATA bus.

DETAILED DESCRIPTION

An apparatus and method for providing connections from a bus bridge to a plurality of bus interfaces utilizing a minimal number of output lines on the bus bridge are disclosed. In the following description, numerous specific details, including specific bus standards, types of data signals transmitted on the bus lines, and the number of interfaces coupled to the bus bridge are set forth to provide a thorough understanding of the preferred embodiment of the present invention. It will be obvious to one skilled in the art that the present invention may be practiced without these specific details. In other instances, well-known circuitry, structures, and methods have not been shown in detail in order to avoid unnecessarily obscuring the present invention.

Figure 1:
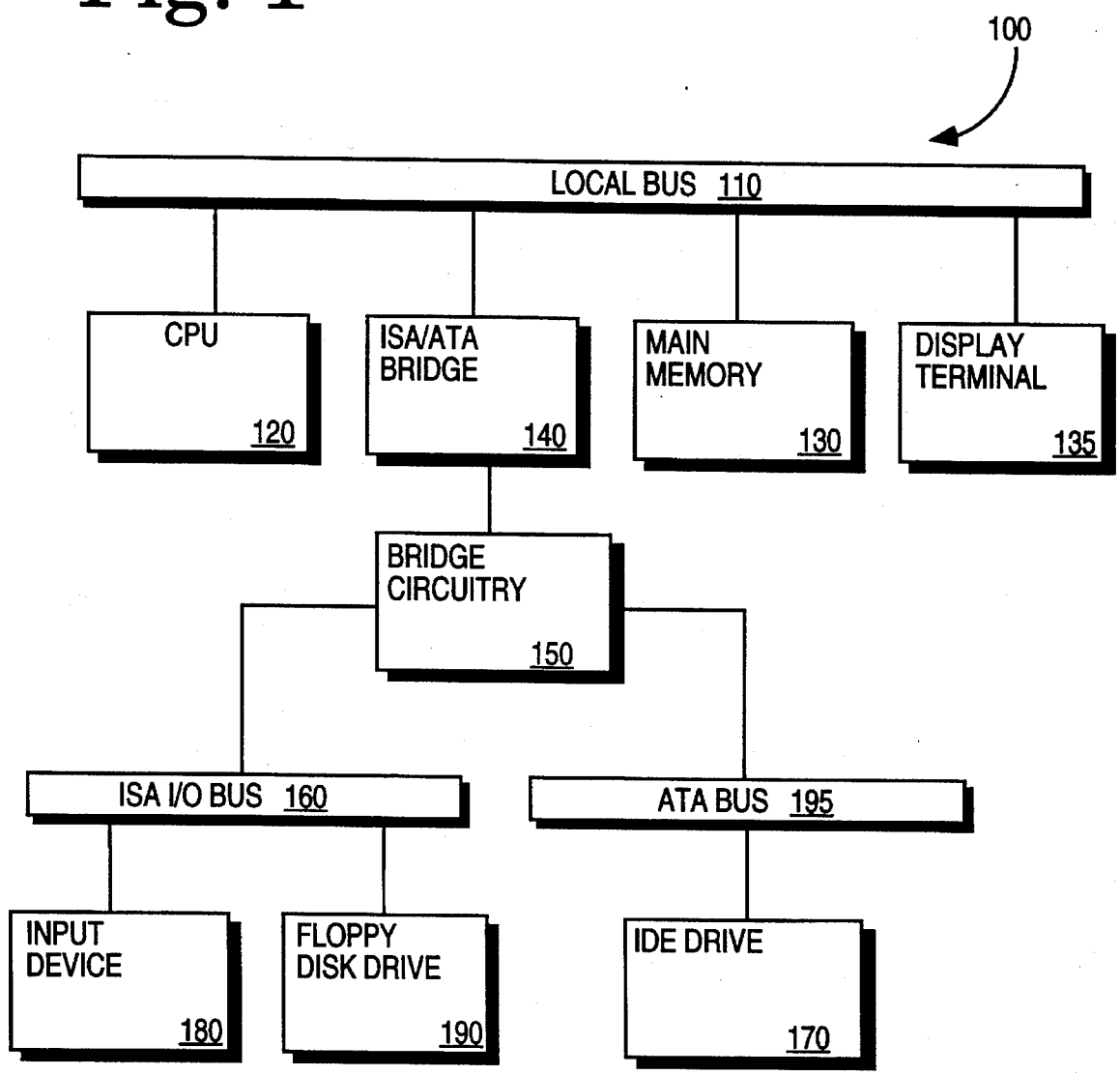
FIG. 1 illustrates the present invention as implemented in a computer system.

FIG. 1 illustrates a computer system 100 utilizing the present invention. The computer system comprises a CPU 120 used for processing information. Main memory 130 is comprised of random access memory (RAM) or some other dynamic storage device which is used in storing information and instructions to be executed by the CPU 120. Main memory 130 may also be used for storing temporary variables or other intermediate information during the execution of instructions by the CPU 120. A local bus 110 is coupled to the CPU 120 and main memory 130 and is used for transferring information between the CPU 120 and main memory 130. The local bus 110 is a high speed bus such as a EISA, VL, or PCI bus. The computer system illustrated in FIG. 1 is a VL computer system which uses the local bus as the CPU system bus. Other computer systems, such as those using a PCI bus, do not use the local bus as the CPU system bus. Display terminal 135 may also be coupled to local bus 110 for displaying output from the CPU 120 to the user.

The computer system 100 also comprises a ISA I/O bus 160 for transferring information to peripheral devices such as a alphanumeric input device 180 and a floppy disk drive 190. Alphanumeric input device 180, including alphanumeric and other keys, may be coupled to the ISA I/O bus 160 for communicating information and commanding elections to CPU 120. The computer system 100 also comprises a ATA bus 195 for transferring information to other peripheral devices. Data storage device 170 such as an IDE drive is coupled to ATA bus 195. The IDE drive stores information and instructions and can operate at data throughput rates in excess of 16 MB/sec.

An ISA/ATA bridge 140 allows the local bus 110 to interface with the ISA I/O bus 160 and the IDE drive 170. Bridge circuitry 150 provides circuitry for connecting the ISA/ATA bridge 140 to the ISA I/O bus 160 and the IDE disk drive 170. Bridge circuitry 150 efficiently utilizes the output lines from the ISA/ATA bridge 140 such that a low pin count packaging for the bridge can be used to interface the Local bus 110 with the ISA I/O bus 160 and the ATA bus 195.

Figure 2:
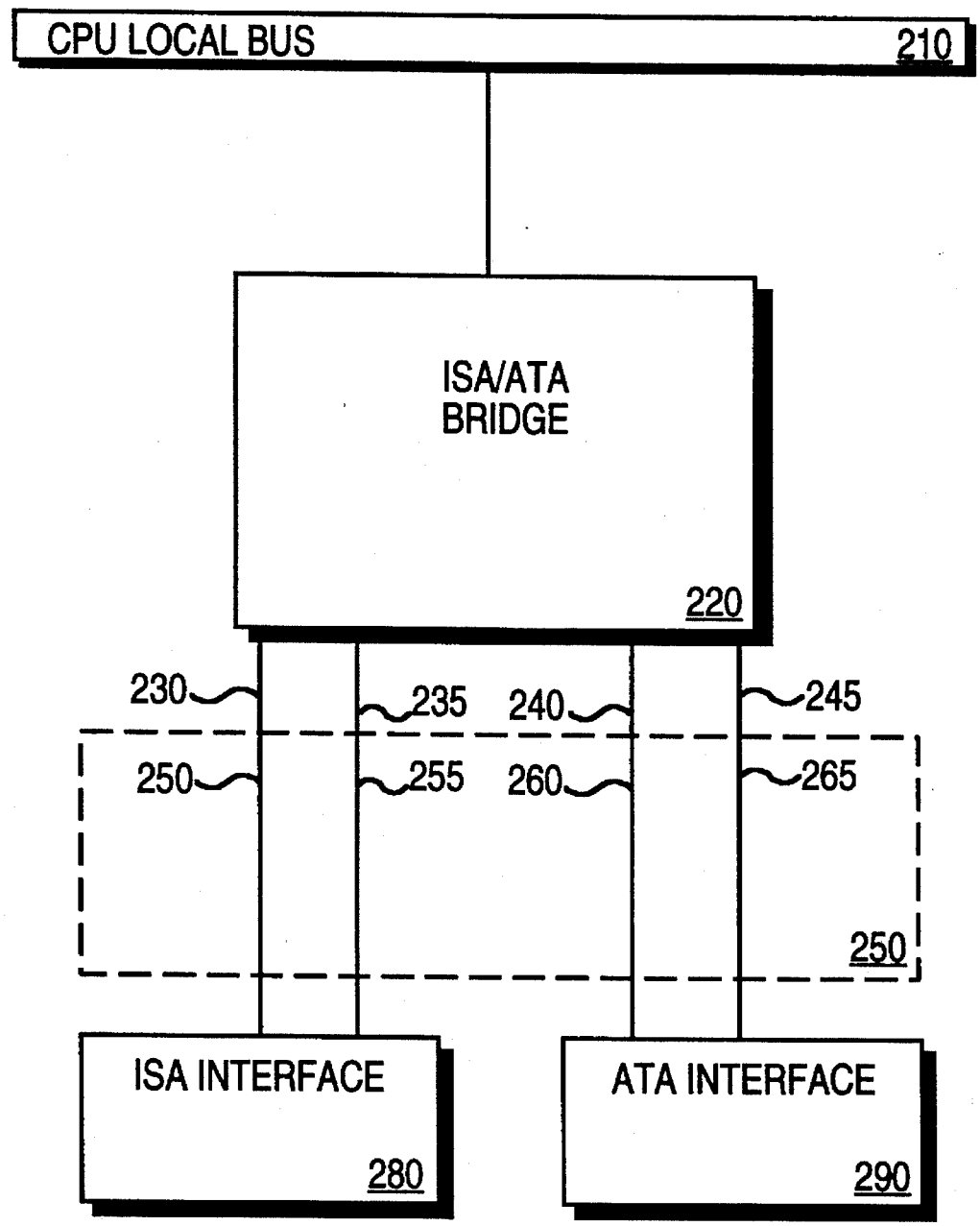
FIG. 2 illustrates one implementation of a combined ISA/ATA bridge component.

FIG. 2 illustrates one implementation of a combined ISA/ATA bridge. Local bus 210 is a high speed bus used for transmitting signals to and from the CPU. ISA/ATA bridge 220 interfaces local bus 210 with ISA interface 280 and ATA interface 290 though bridge circuitry 270.

The ISA interface 280 receives several signals from the ISA/ATA bridge 220, including system address signals, latched address signals, and system byte high enable signal. The ATA interface 295 receives several signals from the ISA/ATA bridge 220, including disk data signals, disk address signals, and chip select signals. Both the ISA bus and ATA bus have loading and protocol requirements which require certain signals to be present on the bus within a short period of time. These signals have tight timing requirements and must be driven directly by the ISA/ATA bridge in order for the signals to meet the ATA timing specifications and not violate any protocol on the ISA bus. For instance, ISA latched address signals have a set-up time which requires them to be present on the latched address bus within tens of nano seconds after they are transmitted to the ISA/ATA bridge 220. ISA system address signals and system byte high enable signal, on the other hand, have shorter set-up times which allow values to be present on the system address bus and the system byte high enable signal within hundreds of nano seconds after those values are transmitted to the ISA/ATA bridge 220. Likewise, ATA disk data signals are required to be present on the disk data bus within tens of nano seconds after they are transmitted to the ISA/ATA bridge 220 in order for the IDE drive to be able to transfer 16 bit words every 120 nano seconds. ATA data address and chip select signals, on the other hand, need to be present on the data address bus and chip select signal bus within hundreds of nano seconds after they are transmitted to the ISA/ATA bridge 220 because they change only once every several hundred data cycles.

In order to satisfy the timing requirements of the ISA bus and the ATA bus, every signal on the ISA/ATA bridge 220 is assigned its own output line through a dedicated pin. Line 230 represents 7 pins on the ISA/ATA bridge 220. These 7 pins are assigned for transmitting latched address signals. Line 250 represents a direct connection on the system circuit board to the ISA interface. Pins 230 on the ISA/ATA bridge 220 interface with direct connection 250 on the system circuit board to directly drive the latched address signals from the ISA/ATA bridge 220 to the ISA interface 280. Line 235 represents 13 pins on the ISA/ATA bridge 220. These 13 pins are assigned for transmitting system address signals and system byte high enable signal. Line 255 represents a direct connection on the system circuit board to the ISA interface. Pins 235 on the ISA/ATA bridge 220 interface with direct connection 255 on the system circuit board to directly drive the system address and system byte high enable signal from the ISA/ATA bridge 220 to the ISA interface 280. Line 240 represents 7 pins on the ISA/ATA bridge 220. These 7 pins are assigned for transmitting disk address and chip select signals. Line 260 represents a direct connection on the system circuit board to the ATA interface 290. Pins 240 on the ISA/ATA bridge 220 interface with direct connection 260 on the system circuit board to directly drive the data address and chip select signals from the ISA/ATA bridge 220 to the ATA interface 290. Line 245 represents 16 pins on the ISA/ATA bridge 220. These 16 pins are assigned to transmit disk data signals. Line 265 represents a direct connection on the system circuit board to the ATA interface. Pins 245 on the ISA/ATA bridge 220 interface with direct connection 265 on the system circuit board to directly drive disk data signals from the ISA/ATA bridge 220 to the ATA interface 290.

In order to directly drive latch address signals to the ISA interface 280 and signal disk data signals to ATA interface 290, the ISA/ATA bridge 220 utilizes 43 dedicated pins 230, 235, 240, and 245. The number of pins used by the ISA/ATA bridge 220 can be reduced if they can be shared in such a way that the timing requirements of both the ISA bus and the ATA bus are still met. FIG. 3 shows the timing requirement of signals which are transmitted to the ISA and ATA interfaces. Latch address signals to the ISA interface and disk data signals to the ATA interface have tight timing requirements. System address and system byte high enable signal to the ISA interface and disk address and chip select signals to the ATA interface do not have tight timing requirements.

Figure 4:
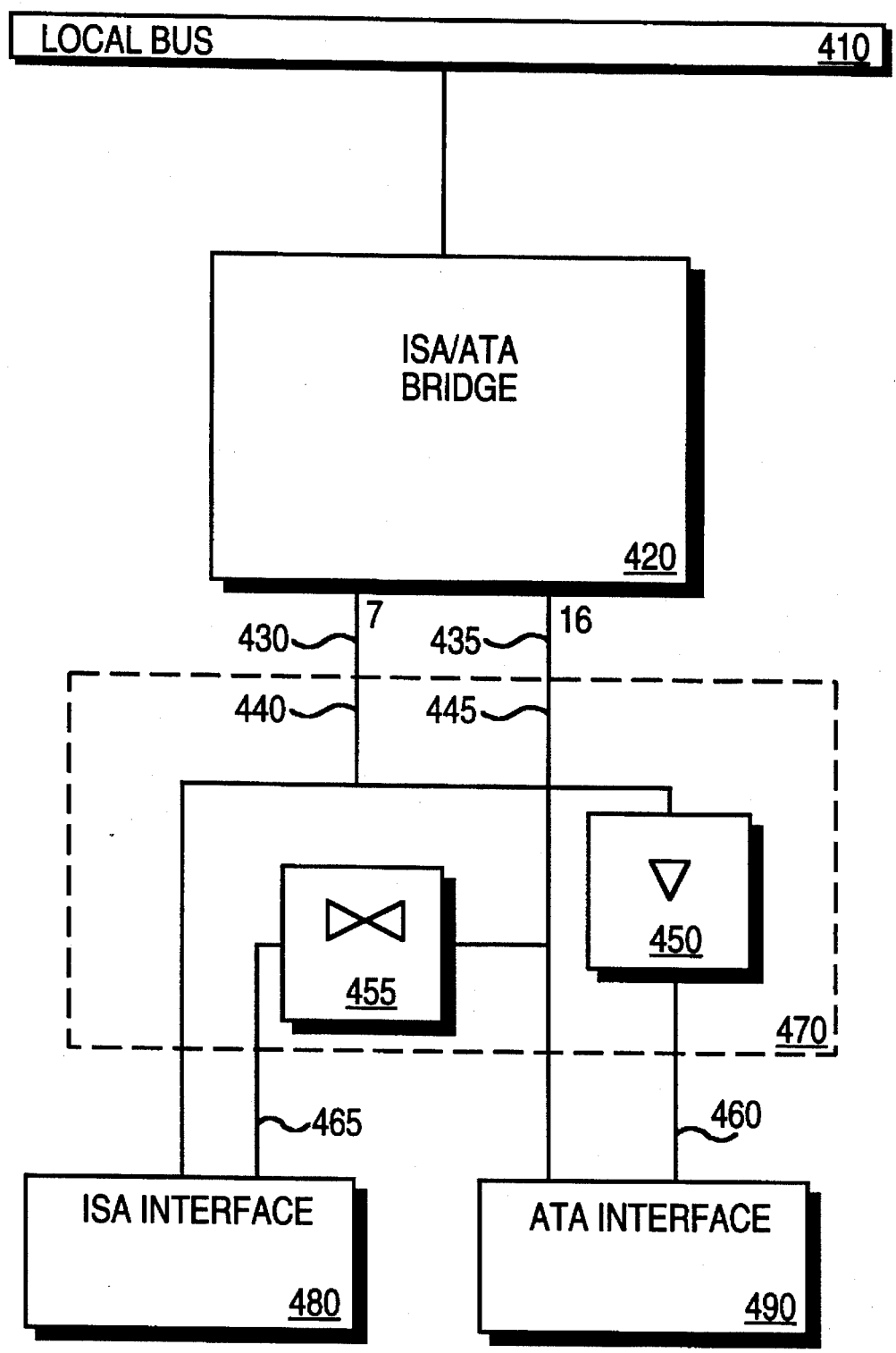
FIG. 4 illustrates a second implementation of a combined ISA/ATA bridge component.

FIG. 4 illustrates a second implementation of a combined ISA/ATA bridge. This second implementation shows a high speed Local bus 410 for transmitting signals to and from the CPU and a ISA/ATA bridge 420 for interfacing the Local bus 410 with ISA interface 480 and ATA interface 490 through bridge circuitry 470. However, instead of assigning every signal from the ISA/ATA bridge to a dedicated pin on the bridge, the bridge circuitry 430 allows the signals from the ISA/ATA bridge 420 to share pins without compromising timing requirements. The signals with tighter timing requirements are given a direct connection from the ISA/ATA bridge 420 to their appropriate interfaces. The signals which do not have tight timing requirements are given a buffered connection from the direct connections to their appropriate interfaces. The buffer provides electrical isolation between the connections and allows the signals with tighter timing requirements to be driven quickly to their appropriate destination. Buffers typically add delay but are relatively inexpensive when compared with designing with a larger ASIC chip or a separate bridge.

Line 430 represents 7 pins on the ISA/ATA bridge designated for transmitting latch address, disk address, and chip select signals to the latch address, disk address, and chip select lines. Pins 430 interface with the system circuit board and connect to a set of 7 lines 440 on the system circuit board. Lines 440 provide a direct connection from the ISA/ATA pins 430 to the ISA interface 480 such that latch address signals are directly driven by the ISA/ATA bridge 420 to meet the timing requirement specified by ISA protocol. Buffer 450 is coupled to line 440 to provide a buffered connection 460 to the ATA interface 490. Data address and chip select signals are transmitted to the ATA interface 490 through the buffered connection 460.

Line 435 represents 16 pins on the ISA/ATA bridge 420 designated for transmitting disk data, system address, and system byte high enable signal to disk data, system address, and system bus high enable lines. Pins 435 interface with the system circuit board and connect to a set of 16 lines 445 on the system circuit board. Lines 445 provide a direct connection from the ISA/ATA pins 435 to the ATA interface 490 such that disk data signals are directly driven by the ISA/ATA bridge 420 to meet the timing requirement specified by ATA protocol. Bi-directional buffer 455 is coupled to lines 445 to provide a buffered connection 465 to the ISA interface 480. System address and system byte high enable signal are transmitted to the ISA interface 480 through buffered connection 465. Bi-directional buffer 455 allows addresses to move in both directions on direct lines 445 and buffered lines 465. When the ISA interface 480 is acting as a bus master, the bi-directional buffer 455 points towards the ISA/ATA bridge 420. When the ISA/ATA bridge 420 is acting as a bus master, the bi-directional buffer 455 points towards the ISA interface 480.

In this example, bridge circuitry 470 allows 20 of 23 dedicated pins 7 and 16 on the ISA/ATA adapter 420 to be shared. By buffering signals with slower timing requirements with signals with faster timing requirements, the bridge circuitry is able to conserve dedicated pins on the ISA/ATA bridge 420 while maintaining the loading requirements and propagation delay requirements of the ISA and ATA interfaces 480 and 490.

Figure 5:
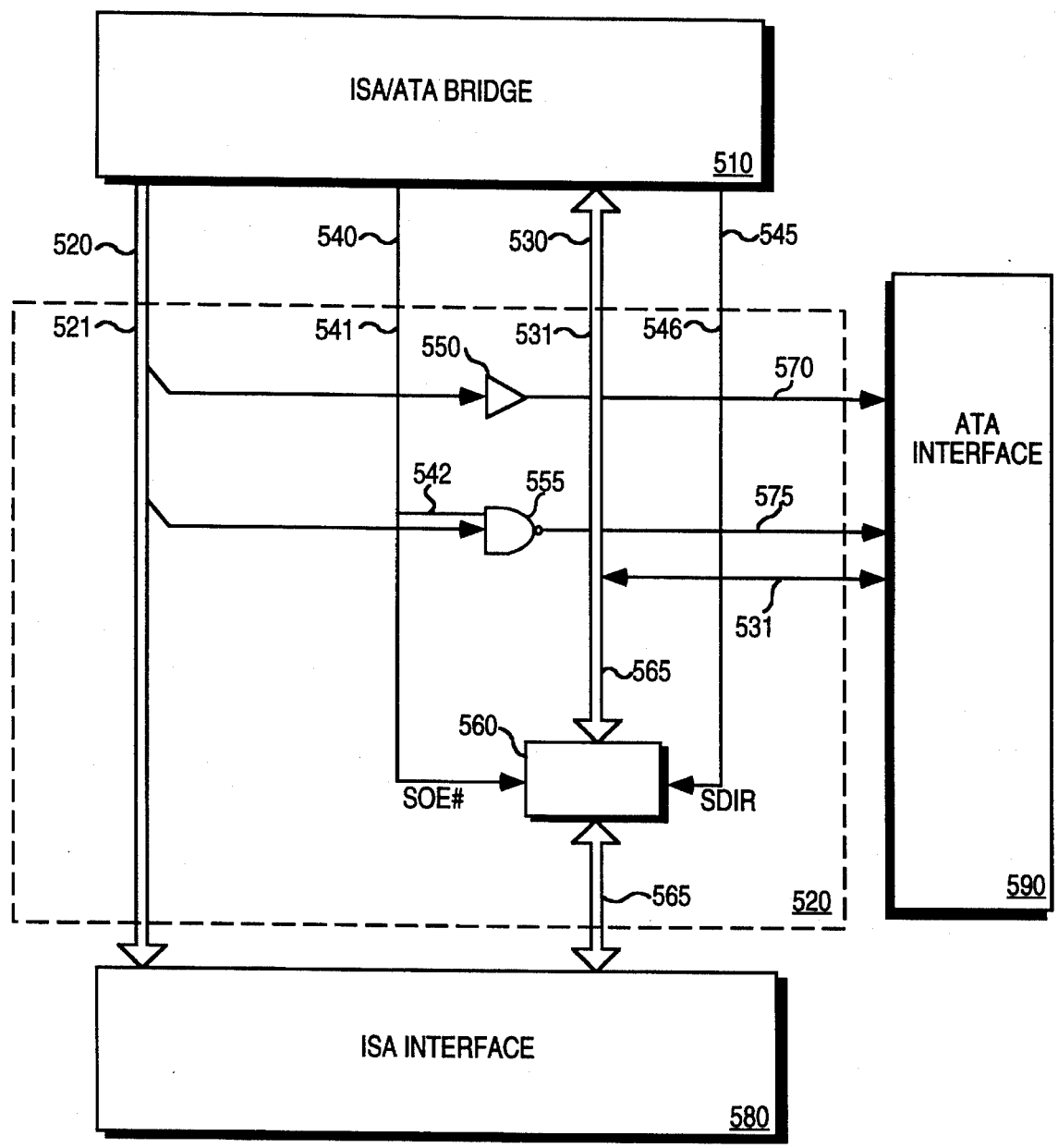
FIG. 5 illustrates one embodiment of the present invention.

FIG. 5 illustrates one embodiment of the present invention 520. Bridge circuitry 520 connects the ISA/ATA bridge 510 to the ISA interface 580 and the ATA interface 590. Line 520 represents 7 pins on the ISA/ATA bridge 510 designated for transmitting latch address, disk address, and chip select signals. Pins 520 interface with the system circuit board and connect to a set of 7 lines 521. Lines 521 on the system circuit board provide a direct connection from ISA/ATA pins 520 to the ISA interface 580 such that latch address signals are directly driven by the ISA/ATA bridge 510 to meet the timing requirement specified by ISA protocol. Buffer 550 is coupled to 3 of the 7 lines 521 on the system circuit board to provide a first buffered connection 570 to the ATA interface 590. Disk address signals are transmitted to the ATA interface 590 through the buffered connection 570. NAND gate 555 is coupled to 4 of the 7 lines 521 on the system circuit board to provide a second buffered connection 575 to the ATA interface 590. Chip select signals are transmitted to the ATA interface 590 through buffered connection 575. SOE# signal from output line 540 on the ISA/ATA bridge is input into NAND gate 555 through lines 541 and 542. SOE# signal is asserted when ISA transactions are being driven. When asserted low, SOE# disables all chips selects driven to the ATA interface 590. This prevents multiple chip selects from asserting at the same time.

Line 530 represents 16 pins on the ISA/ATA bridge 510 designated for transmitting disk data, system address, and system byte high enable signal. Pins 530 interface with system circuit board and connect to a set of 16 lines 531 on the system circuit board. Lines 531 provide a direct connection from the pins on the ISA/ATA bridge 510 to the ATA interface 590 such that disk data signals are directly driven by the ISA/ATA bridge 510 to meet ATA timing requirements. A 74ALS245 transceiver 560 coupled to lines 531 is used as a bi-directional buffer. The transceiver 560 provides a buffered connection 565 for transmitting system address and system byte high enable signal to the ISA interface 580.

The transceiver 560 is controlled by signals SOE# and SDIR. SOE# signal from output line 540 on the ISA/ATA bridge 510 is input into transceiver 560 through line 541 on the system circuit board. SDIR signal from output line 545 on the ISA/ATA bridge 510 is input into transceiver 560 through line 546 on the system circuit board. SOE# signal enables the transceiver 560 to drive its outputs in the direction determined by the SDIR signal. SDIR signal dictates whether the transceiver 560 points towards the ISA/ATA bridge 510 or toward the ISA interface 580. The transceiver 560 allows signals to travel in both directions on lines 531 and 565.

Figure 6A:
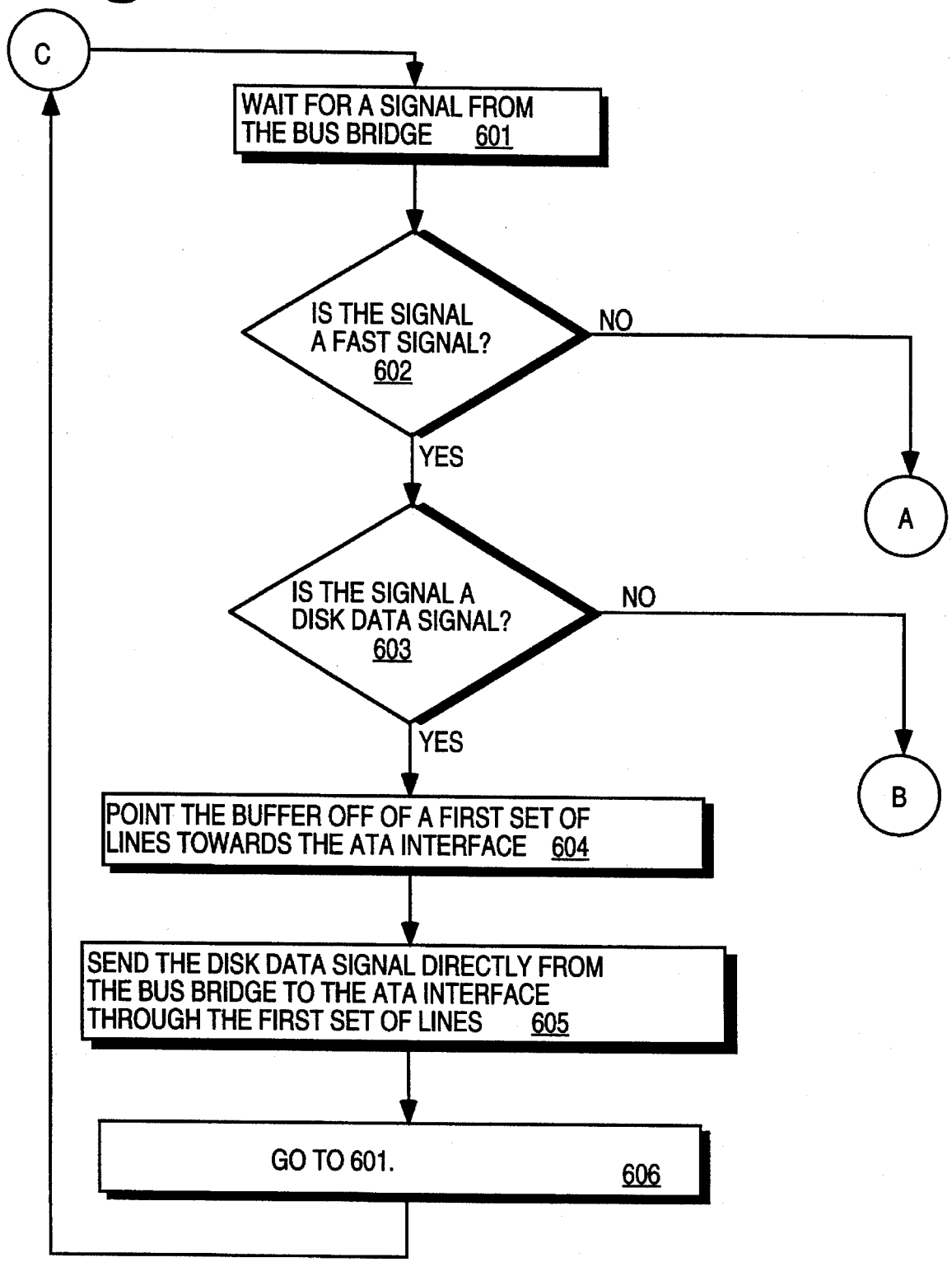
FIGS. 6a, 6b, and 6c show a flow chart illustrating the steps for providing connections from a bus bridge to an ISA interface and a ATA interface which allows the bus bridge to utilize a minimal number of output lines.
Figure 6B:
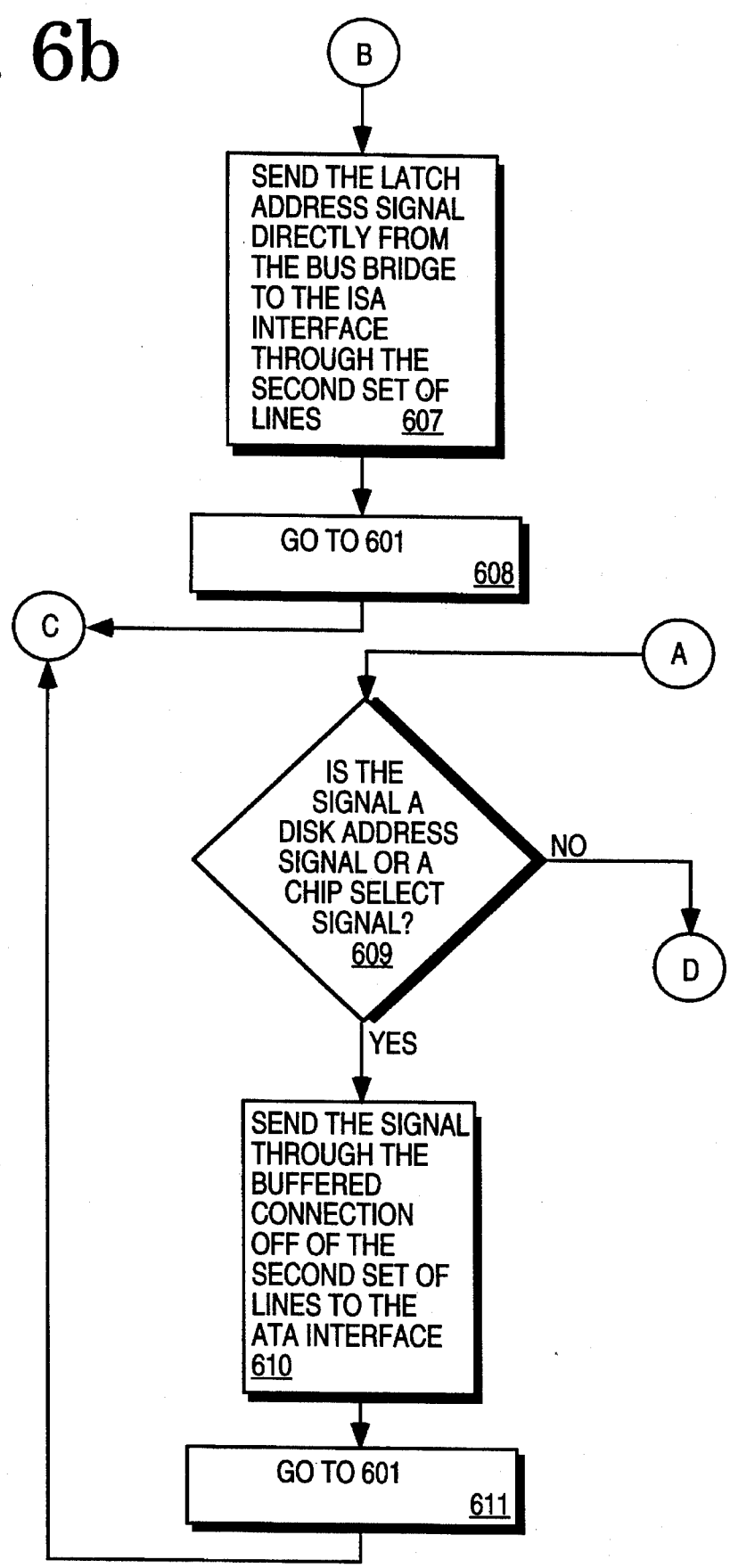
Figure 6C:
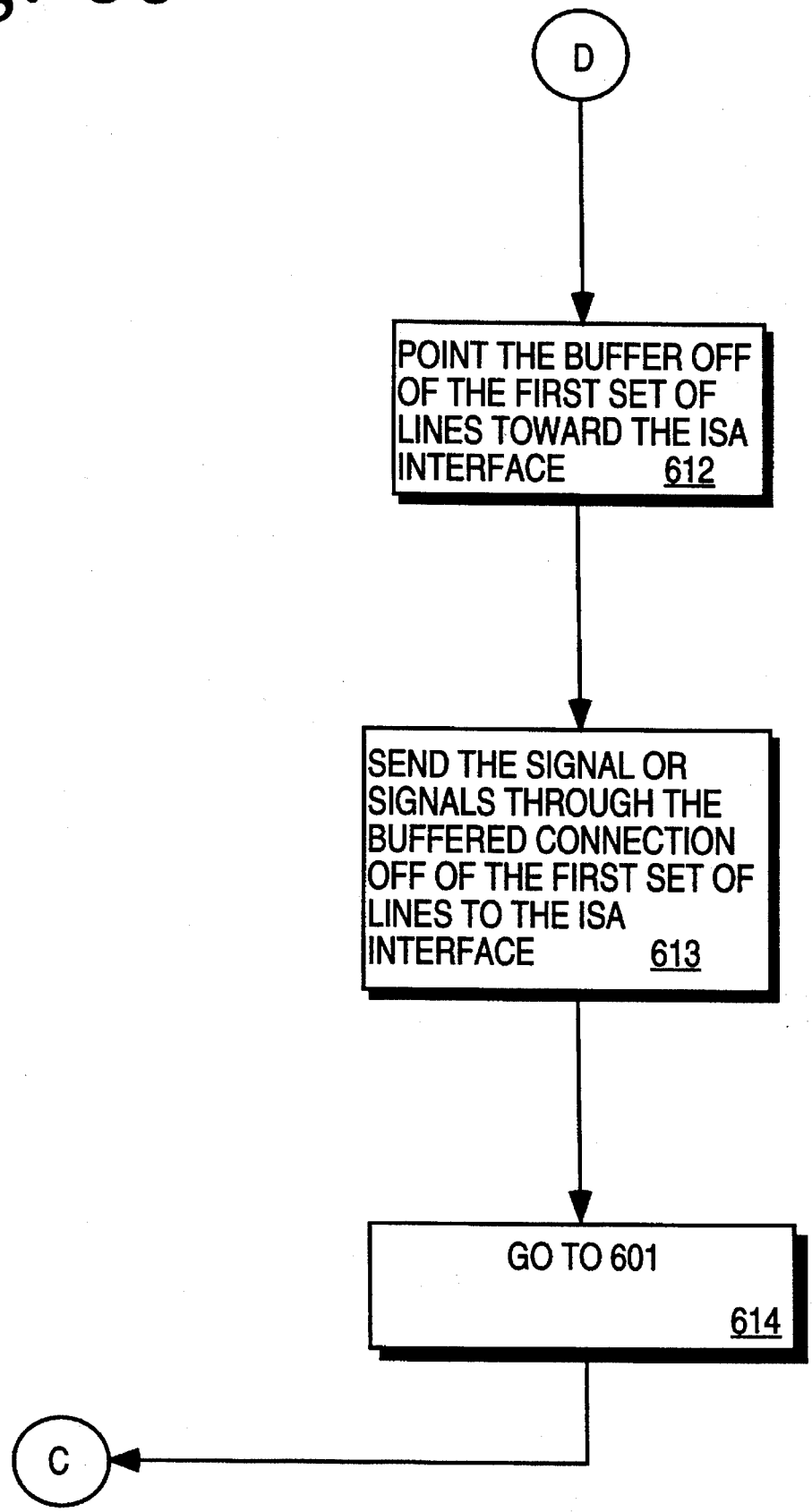

FIGS. 6a, 6b, and 6c show a flow chart illustrating the steps for providing connections from a bus bridge to an ISA interface and ATA interface which allows the bus bridge to utilize a minimal number of output lines. First, wait for a signal from the bus bridge, step 601. Determine if the signal is a fast signal or a slow signal, step 602. Fast signals are latch address or disk data signals which have tight timing requirements and need to be present on the latch address and disk data lines within tens of nano seconds after they are present on the bus bridge. If the signal is not a fast signal, go to step 609. If the signal is a fast signal, determine whether the signal is a disk data signal, step 603. If the signal is not a disk data signal, go to step 607. If the signal is a disk data signal, point a buffer off of a first set of lines toward the ATA interface, step 604. Send the disk data signal directly from the bus bridge to the ATA interface through the first set of lines, step 605. Go to step 601, step 606.

Step 607 sends the latch address signals directly from the bus bridge to the ISA interface through the second set of lines. Step 608 requires one to go back to step 601.

Steps 609 through steps 614 prepare connections for the slow signals. Slow signals are signals which do not have tight timing requirements and need not be present on the ISA or ATA interfaces for hundreds of nano seconds after they are transmitted to the bus bridge. First, determine whether the signal is a disk address signal or chip select signal, step 609. If the signals is neither a disk address nor chip select signal, go to step 612. If the signal is a disk address or chip select signal, send the signal through the buffered connection off of the second set of lines to the ATA interface, step 610. Step 611 requires that one return to step 601.

Step 612 prepares a connection for system address and system byte high enable signal by requiring the buffer off of the first set of data lines to be pointed towards the ISA interface. The signal is sent through the buffered connection off of the first set of lines to the ISA interface, step 613. Step 614 requires that one return to step 601.

From the forgoing, it is recognized that the illustrated bus bridge circuitry provides a means for which a bus bridge interfacing a plurality of bus interfaces can utilize a minimal number of output lines.

What is claimed is:

1. An apparatus for transmitting signals from a bus bridge to an ISA interface and an ATA interface comprising:

a first direct connection that transmits latched address signals from the bus bridge to the ISA interface;

a second direct connection that transmits disk data signals from the bus bridge to the ATA interface;

a first buffered connection from the first direct connection that transmits disk addresses and chip select signals to the ATA interface; and a second buffered connection from the second direct connection that transmits system address and system byte high enable signals to and from the ISA interface.

2. An apparatus for transmitting signals from a bus bridge to an ISA interface and an ATA interface comprising:

a first direct transmission means from the bus bridge to the ISA interface for transmitting latched address signals;

a second direct transmission means from the bus bridge to the ATA interface for transmitting disk data signals;

a first buffered transmission means from the first direct transmission means for transmitting disk addresses and chip select signals to the ATA interface; and a second buffered transmission means from the second direct transmission means for transmitting system address and system byte high enable signals to and from the ISA interface.

3. A computer system comprising:

a microprocessor;

a local bus coupled to the microprocessor;

an ISA bus;

an ATA bus a bus bridge, coupling the local bus with the ISA bus and ATA bus;

an apparatus that transmits signals from the bus bridge to the ISA bus and the ATA bus including a first direct connection that transmits latched address signals from the bus bridge to the ISA bus;

a second direct connection that transmits disk data signals from the bus bridge to the ATA bus;

a first buffered connection from the first direct connection that transmits disk addresses and chip select signals to the ATA bus; and a second buffered connection from the second direct connection that transmits system address and system byte high enable signals to and from the ISA bus.

4. A computer system comprising:

processing means;

a local bus coupled to the processing means;

an ISA bus;

an ATA bus;

bus bridge means, coupling the local bus with the ISA and ATA bus;

means for transmitting signals from the bus bridge to the ISA bus and the ATA bus including a first direct transmission means from the bus bridge means to the ISA bus for transmitting latched address signals;

a second direct transmission means from the bus bridge to the ATA bus for transmitting disk data signals;

a first buffered transmission means from the first direct transmission means for transmitting disk addresses and chip select signals to the ATA bus; and a second buffered transmission means from the second direct transmission means for transmitting system address and system byte high enable signals to and from the ISA bus.

5. A method for transmitting signals from a bus bridge to an ISA interface and an ATA interface, the method comprising:

transmitting latched address signals on a first direct connection from the bus bridge to the ISA interface;

transmitting disk data signals on a second direct connection from the bus bridge to the ATA interface;

transmitting disk address and chip select signals on a first buffered connection from the first direct connection to the ATA interface; and transmitting system address and system byte high enable signals on a second buffered connection from the second direct connection to the ISA interface.

6. An apparatus for transmitting signals from a bus bridge to an ISA interface and an ATA interface comprising:

a first direct connection from the bus bridge to the ATA interface that transmits disk data signals;

a second direct connection from the bus bridge to the ISA interface that transmits latched address signals;

a buffered connection from the first direct connection to the ISA interface that transmits system address and system byte high enable signals; and a buffered connection from the second direct connection to the ATA interface that transmits disk address and chip select signals.

* * * * *